US012437952B2

(12) United States Patent
Milliere et al.

(10) Patent No.: US 12,437,952 B2
(45) Date of Patent: *Oct. 7, 2025

(54) FUSE AND ASSOCIATED MANUFACTURING PROCESS

(71) Applicant: MERSEN France SB SAS, Saint-Bonnet-de-Mure (FR)

(72) Inventors: Laurent Milliere, Lyons (FR); Franck Sarrus, Saint Laurent de Mure (FR); Jean-François De Palma, St Barthelemy d'Anjou (FR)

(73) Assignee: MERSEN France SB SAS, Saint-Bonnet-de-Mure (FR)

(*) Notice: Subject to any disclaimer, the term of this patent is extended or adjusted under 35 U.S.C. 154(b) by 0 days.

This patent is subject to a terminal disclaimer.

(21) Appl. No.: 18/006,821

(22) PCT Filed: Jul. 28, 2021

(86) PCT No.: PCT/EP2021/071152

§ 371 (c)(1),
(2) Date: Jan. 25, 2023

(87) PCT Pub. No.: WO2022/023418

PCT Pub. Date: Feb. 3, 2022

(65) Prior Publication Data

US 2024/0258059 A1 Aug. 1, 2024

(30) Foreign Application Priority Data

Jul. 29, 2020 (FR) ...................................... 2008034

(51) Int. Cl.
*H01H 85/38* (2006.01)
*H01H 69/02* (2006.01)
(Continued)

(52) U.S. Cl.
CPC ............ *H01H 85/38* (2013.01); *H01H 69/02* (2013.01); *H01H 85/08* (2013.01); *H01H 85/153* (2013.01); *H01H 2085/388* (2013.01)

(58) Field of Classification Search
CPC ........ H01H 85/38; H01H 69/02; H01H 85/08; H01H 85/153; H01H 2085/381–383; H01H 2085/388
See application file for complete search history.

(56) References Cited

U.S. PATENT DOCUMENTS 3,238,333 A * 3/1966 Kozacka ............ H01H 85/0456 337/296
3,601,737 A 8/1971 Baird et al.
(Continued)

FOREIGN PATENT DOCUMENTS

FR 3089051 A1 5/2020
WO 2016064352 A1 4/2016

OTHER PUBLICATIONS

Search Report for French Application No. 2008034 dated Apr. 14, 2021.
(Continued)

*Primary Examiner* — Jacob R Crum
(74) *Attorney, Agent, or Firm* — McDonald Hopkins LLC

(57) ABSTRACT

Fuse, including at least one fuse blade, formed in a sheet having two opposite main faces extending along a longitudinal axis of the fuse blade, each fuse blade comprising a portion having a reduced section defining a plane transverse to the fuse blade. The fuse also includes arc guards made of a preformed elastic material and associated in pairs, the arc guards of the same pair being each located opposite one another on a respective main face of the same fuse blade. For at least a first pair of arc guards, a layer of adhesive is interposed between the fuse blade and an internal face of each arc guard of this pair, the internal face being oriented
(Continued)

towards one of the main faces of the fuse blade, so as to fix each arc guard on the fuse blade.

23 Claims, 10 Drawing Sheets

(51) Int. Cl.
*H01H 85/08* (2006.01)
*H01H 85/153* (2006.01)

(56) References Cited

U.S. PATENT DOCUMENTS

| | | | | |
|---|---|---|---|---|
| 4,032,879 | A * | 6/1977 | Monagan | H01H 85/42 337/281 |
| 5,596,306 | A | 1/1997 | Kowalik et al. | |
| 6,160,471 | A | 12/2000 | Rybka et al. | |
| 11,094,492 | B2 | 8/2021 | Li | |
| 2015/0294828 | A1 | 10/2015 | Burge | |
| 2015/0348732 | A1* | 12/2015 | Douglass | H01H 85/175 337/198 |
| 2016/0141140 | A1* | 5/2016 | Schmidt | H01H 85/143 337/187 |
| 2016/0217960 | A1* | 7/2016 | Abad | H01H 85/143 |
| 2016/0268089 | A1* | 9/2016 | Schlaak | H01H 85/38 |
| 2020/0168424 | A1 | 5/2020 | Li | |

OTHER PUBLICATIONS

Search Report for International Application No. PCT/EP2021/071152 dated Sep. 30, 2021.

* cited by examiner

FUSE AND ASSOCIATED MANUFACTURING PROCESS

CROSS-REFERENCE TO RELATED APPLICATIONS

This is a National Stage application of PCT international application PCT/EP2021/071152, filed on Jul. 28, 2021, which claims priority from French Patent Application No. 2008034, filed on Jul. 29, 2020, both which are incorporated herein by reference in their entirety.

The present invention relates to a fuse and an associated manufacturing method.

A fuse is an electrical component comprising two terminals and making it possible, in the event of an overcurrent beyond a limit called the fuse rating, to interrupt the flow of electric current between the two terminals. The two terminals are fixed to an insulating body and are electrically connected to one another by means of at least one fuse blade, disposed within a cavity formed in the insulating body. One or more fuse blades may be connected in parallel to the two terminals depending on the size of the fuse. What is described for a fuse blade may be transposed to other fuse blades when there are several.

A fuse blade is made of a conductive material having a given electrical resistance and a given melting temperature. In normal operation, the current passes through the fuse blade and the temperature of the fuse blade remains below the melting temperature. In the event of an overcurrent, the temperature of the fuse blade increases and exceeds the melting temperature at one or more points of the fuse blade, which at least partially melts, and the flow of current is irreversibly cut off. The fuse blade comprises, between the connections with the two poles, at least one intermediate portion having a reduced surface section. Such an intermediate portion is called a “reduced section”. Each reduced section offers greater resistance to the flow of current than the rest of the blade. As the intensity of the current flowing through the blade increases, the temperature of each reduced section increases more than the temperature of the rest of the blade. In the event of an overcurrent, the blade preferably melts at a reduced section.

When a reduced section melts, an electric arc is created, and the current continues to flow until the electric arc is extinguished. The electric arc, defined as a plasma state of matter, causes strong localized heating which favors the fusion of the fuse blade. With thermal and electrical conditions, this change in state of the material of the fuse blade in turn promotes the maintenance and elongation of the electric arc.

It is known practice to place arc guards of elastic material on the fuse blade in order to limit the propagation of the arc. For example, silicone may be applied to the fuse blade in the pasty state, with several hours of waiting then being necessary for the silicone to crosslink and harden completely. With this method, the geometry of the arc guards thus produced is approximate. Waiting times slow down production and harmful solvents often evaporate.

U.S. Pat. No. 2,015,294 828-A1 teaches riveting hardened silicone strips on the fuse blade. Rivet assembly is industrially very delicate and risks damaging the fuse blade.

It is these problems that the invention more particularly intends to remedy by proposing a fuse offering better performance and that is easier to assemble.

To this end, the invention relates to a fuse, comprising:

- at least one fuse blade, formed in a sheet having two opposite main faces extending along a longitudinal axis of the fuse blade, each fuse blade comprising a portion in which is formed a reduced section defining a plane transverse to the fuse blade,
- two connection terminals, each terminal being connected to each fuse blade,
- arc guards, made of a preformed elastic material, which are associated in pairs, the arc guards of the same pair each being located on a respective main face of the same fuse blade.

According to the invention, for at least a first pair of arc guards, a layer of adhesive is interposed between the fuse blade and an internal face of each arc guard of this pair, the internal face being oriented towards one of the main faces of the fuse blade, so as to fix each arc guard on the fuse blade.

Thanks to the invention, the arc guards are easy to assemble to the fuse blade, which is a source of time savings during manufacture. The risk of damage during assembly is reduced.

According to advantageous but not mandatory aspects of the invention, such a fuse may incorporate one or more of the following characteristics taken in isolation or in any technically feasible combination:

- the fuse comprises, besides the first pair of arc guards, a second pair of arc guards, first and second pairs of arc guards being separated from; each other by at least one reduced section;
- each arc guard comprises a front face, oriented towards a reduced section, and a rear face opposite the front face, while the front and rear faces of each arc guard are separated by a length of between 5 mm and 30 mm;
- a distance between the front face and a reduced section boundary line located opposite is between 0.5 mm and 20 mm, preferably between 1 mm and 15 mm, more preferably between 2 mm and 12 mm;
- each arc guard comprises an external face, opposite the internal face, each arc guard having a thickness, defined as being a distance separating the internal face from the external face, between 0.2 mm and 20 mm;
- the arc guards are made of an elastomeric material, which has a hardness, measured on a Shore-A scale, between 20 and 90, preferably between 40 and 70;
- the arc guards are made of silicone;
- at least one perforation is made in the fuse blade on one side of the reduced section, each of said perforations being at least partially closed by the internal faces of two arc guards of the same pair;
- the perforations extend parallel to the longitudinal direction of the fuse blade beyond the rear face of the arc guards, so as to form rear vents;
- the rear vents have a length between 0.1 mm and 10 mm, preferably between 0.5 and 8 mm, more preferably between 1 mm and 5 mm;
- the perforations extend parallel to the longitudinal direction of the fuse blade beyond the front face of the arc guards so as to form front vents, wherein the front vents have a length of between 0.1 mm and 5 mm, preferably between 1 and 3 mm;
- the fuse comprises an frame, which is received in a cavity of a fuse body and which limits the movements of the fuse blades with respect to the body by means of spacers and/or shims, and
- when the fuse is assembled, the arc guards are compressed in a direction orthogonal to the main faces of the fuse blade, each arc guard having a thickness less than 99% of the thickness of this same arc guard when this arc guard is not subjected to any external stress, preferably less than 98%, more preferably less than 95%.

The invention also relates to a method of manufacturing a fuse as described above, the fuse comprising at least one fuse blade with a reduced section defining a plane transverse to the fuse blade. The method comprises the steps of:

- manufacturing two arc guards of a first pair, the arc guards being made of an elastic crosslinked material and having a flat internal face,
- gluing each arc guard of the first pair on a respective main face of the fuse blade in the vicinity of the reduced section, by interposing a layer of adhesive between the internal face of each arc guard and a respective main face of the fuse blade so that a distance between a front face of each arc guard and a border line of the reduced section opposite is between 1 mm and 15 mm.

Advantageously, the method comprises a step, prior to the gluing step, consisting in providing in the fuse blade at least one perforation on each side of the transverse plane, while during the gluing step, the arc guards of the first pair are glued to the fuse blade so that each perforation is at least partially blocked by the arc guards.

The invention will be better understood, and other advantages thereof will appear more clearly in the light of the description which follows, of several embodiments of a fuse in accordance with its principle, given solely by way of example, and made with reference to the accompanying drawings, in which.

Figure 1:
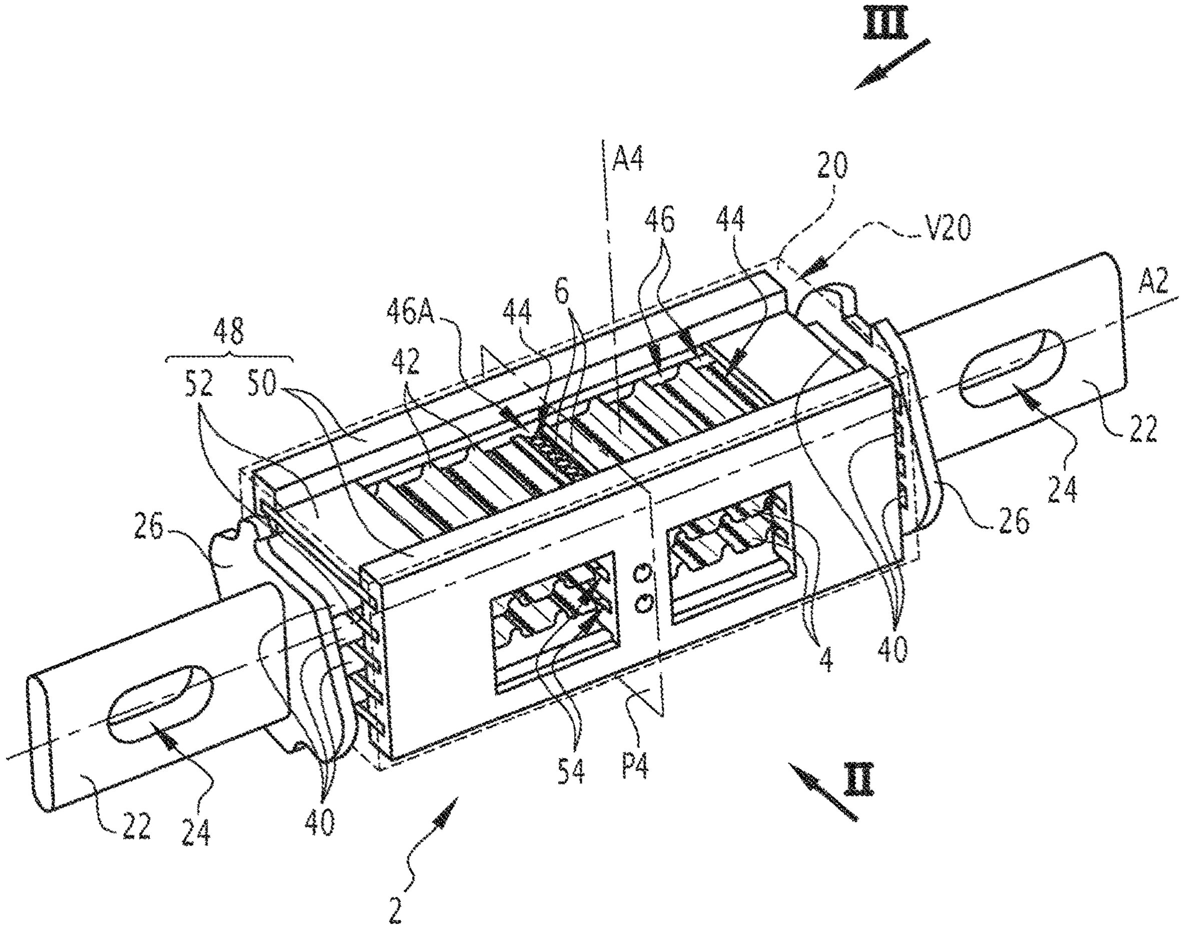
FIG. 1 is a perspective view of a fuse comprising several fuse blades and arc guards in accordance with a first embodiment of the invention, some parts being shown schematically to facilitate reading.

A fuse 2 is shown in FIG. 1. The fuse 2 comprises a body 20, shown diagrammatically in dotted lines, and two connection terminals 22.

The body 20 is made of an insulating material, for example ceramic. The body 20 generally has the shape of an elongated cylinder defining a longitudinal axis A2 of the fuse 2. In the example illustrated, the body 20 has a parallelepiped shape, i.e. the body 20 is a cylinder of rectangular section. In a non-limiting variant, the body 20 has an elliptical, or even circular, section. A transverse direction is defined as being a direction orthogonal to the axis A2. A transverse plane of the fuse 2 is thus a plane orthogonal to the axis A2.

In the example illustrated, the terminals 22 are disposed on two respective faces of the body 20, opposite and orthogonal to the axis A2. Each terminal 22 has the shape of a cylinder of oval section and of a generator parallel to the axis A2. An oblong hole 24 is made through each terminal 22. Each terminal 22 comprises a plate 26, intended for assembling the fuse 2 to a fuse holder, not shown.

The body 20 of the fuse 2 comprises a cavity V20, in which are housed fuse blade 4. Each fuse blade 4 comprises two opposite attachment ends 40, each end 40 being connected to one of the terminals 22. The fuse blades 4 are thus electrically connected in parallel to the terminals 22. In other words, each terminal 22 is connected to one of the respective attachment ends 40 of each fuse blade 4.

The fuse blades 4 are here four in number, this number may vary depending on the size of the fuse 2, in particular depending on the voltage and the amperage for which the fuse 2 is designed. When a fuse 2 comprises several fuse blades 4, the fuse blades 4 advantageously have the same structure and operate in the same way. The fuse blades 4 of the fuse 2 are preferably identical. What is explained for one fuse blade 4 may be transposed to the other fuse blades 4.

The fuse blades 4 are elements made of a conductive material, which has an electrical resistance and a melting temperature. The material of the fuse blades 4 is preferably metallic, for example silver, denoted Ag. Each fuse blade 4 here has the shape of an elongated rectangle, the long sides of which are disposed parallel to the axis A2. Each fuse blade 4 has a constant width, measured transversely to the axis A2.

Each fuse blade 4 here has a symmetrical shape with respect to a transverse plane P4 and is formed in a sheet, which has two opposite main faces, which extend along the longitudinal axis A2 and which comprise flat portions separated by transverse folds 42. In the example illustrated, the flat portions of the same fuse blade 4 are located in the same mean plane, the mean planes of each of the fuse blades 4 being mutually parallel and defining a main axis denoted A4. Axis A4 is an axis transverse to axis A2. As a variant, the flat portions of the same fuse blade 4 are not all located in the same mean plane.

Rows of holes 44 are made in some of the flat portions of each fuse blade 4, each row of holes 44 being oriented transversely to the axis A2 and defining a reduced section 46. In other words, each fuse blade 4 comprises an intermediate portion between the two fastening ends 40 in which a reduced section 46 is provided.

Each fuse blade 4 has, at the level of each reduced section 46, an electrical resistance greater than the electrical resistance elsewhere than at the level of the reduced sections 46. Thus, when an electric current flows between the terminals 22, the fuse blade 4 has, at the reduced sections 46, localized heating. In the event of an overcurrent, the melting of the material of the fuse blade 4 preferably occurs at the reduced sections 46.

In the example illustrated, each fuse blade 4 has several types of reduced sections 46, the holes 44 for example having different diameters depending on the reduced section 46 considered. Thus, when an overcurrent occurs, some reduced sections 46 are likely to melt faster than others. When the fuse blade 4 comprises a single type of reduced section 46, its response curve “cut-off time/cut-off current” has a given aspect. By combining different types of reduced sections 46, a response curve is obtained which is the superposition of each of the response curves corresponding to each of the sections. This aspect is not detailed further in the present description.

In the example illustrated, the fuse 2 also comprises an frame 48, which is received in the cavity V20 of the body 20. The frame 48 is not essential for the implementation of the invention described in the present description, but contributes to its implementation. The frame 48 serves, among other things, to assemble the body 20 to the rest of the fuse 2 and to hold the fuse blade 4, for example to protect them during the manufacture of the fuse 2. The fuse blades 4 are in fact very thin and flexible, the fuse blades 4 may have thicknesses of the order of 0.1 mm or even less.

The frame 48 is made of an insulating material, preferably rigid, for example a synthetic material, optionally reinforced with inorganic fibers such as glass fibers. By way of non-limiting examples, the reinforcement 48 may be made of polyimide—also denoted PI—, polyetheretherketone—also denoted PEEK—, polytetrafluoroethylene—also denoted PTFE—, polyamide—also denoted PA—, silicone or polyphenylsulfone—also denoted PPSU.

In the example illustrated, the frame 48 comprises two side panels 50, located opposite one another and connected to one another by spacers 52. The structure of the frame 48 is not non-limiting.

Each panel 50 comprises, on one face oriented towards the other panel 50, notches 54 for retaining the fuse blades 4.

Figure 2:
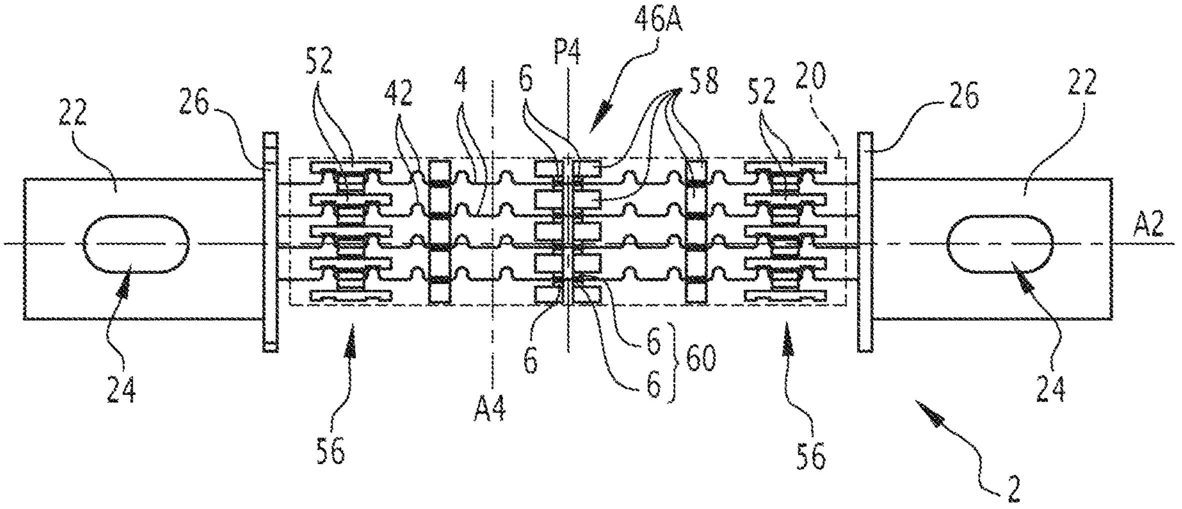
FIG. 2 is a view of the fuse of FIG. 1, along arrow II in FIG. 1, some parts being omitted to facilitate reading.

In the example illustrated in FIG. 2, the spacers 52 are shown in section, while the side panels 50 are not shown. The spacers 52 are here grouped together in two stacks 56 of five spacers 52 each, each stack 56 being here disposed in the vicinity of the attachment ends of the fuse blade 4. A fuse blade 4 is thus held, by pinching, between two neighboring spacers 52, while the two spacers 52 located at the ends of each stack 56 are supported on the body 20, on the inside of the cavity V20. When the body 20 is assembled to the rest of the fuse 2, the spacers 52 limit the amplitude of the movements of the fuse blades 4 relative to the rest of the fuse 2.

In addition to the fuse blade 4 and the frame 48 received in the cavity V20 of the body 20, the cavity 20 is generally filled with a powder serving to absorb part of the energy of the electric arc appearing in the event of an overcurrent, contributing faster arc extinction and faster interruption of electric current. Such a powder, not shown in the figures, is preferably in the form of micrometric particles and is for example silica sand.

In the example illustrated, one of the reduced sections 46 of each fuse blade 4, referenced 46A, is disposed astride a transverse plane coincident with the transverse plane P4. In the following, the reduced section 46A is mainly considered, knowing that what is valid for the reduced section 46A may generally be transposed to the other reduced sections 46.

Figure 3:
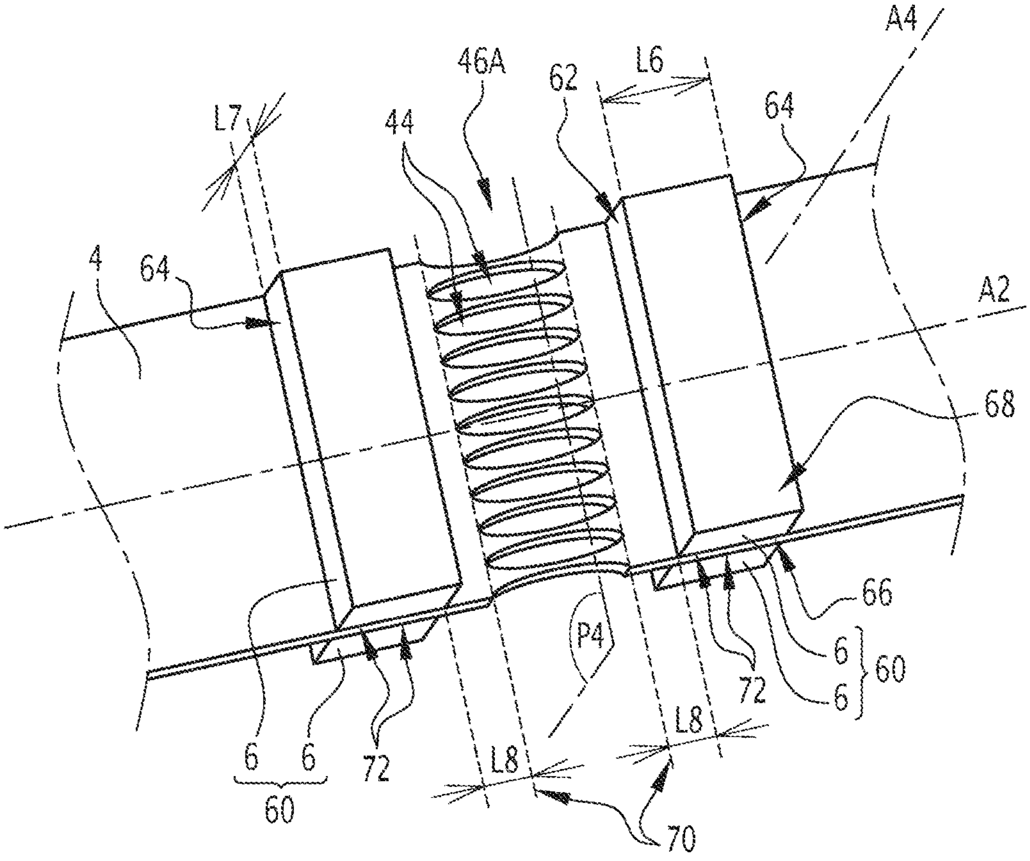
FIG. 3 is a schematic perspective view on a larger scale of a fuse blade and arc guards of FIG. 1, along arrow III in FIG. 1.

Arc guards 6, visible in section in FIG. 2 and on a larger scale in perspective in FIG. 3, are disposed in the vicinity of each reduced section 46A. In particular, for each reduced section 46A, four arc guards 6 are disposed, on the one hand, symmetrically with respect to the transverse plane P4 and, on the other hand, symmetrically with respect to the fuse blades 4. Two arcs guards 6 located on the same side of the transverse plane P4 thus form a pair 60 of arc guards 6, the arc guards 6 of the same pair 60 each being located opposite one another on a respective main face of the same fuse blade 4.

In the example illustrated, the two pairs 60 of arc guards 6 are separated from one another by a single reduced section 46A. In a variant not shown, two pairs 60 of arc guards 6 are separated by several reduced sections 46 or 46A.

The arc guards 6 have similar shapes and operate in the same way. In particular, the arc guards 6 of the same pair 60 are preferably identical. In the remainder of the description, it is considered that the four arc guards 6 located in the vicinity of the reduced section 46A are identical.

The arc guards 6, also known as "arc suppressors", are made of a preformed polymer material, i.e. a material already crosslinked. The material of the arcs 6 is an elastic material, i.e. a material capable of deforming under the effect of mechanical stress and of returning to its initial shape in the absence of stress. In the example illustrated, the arc guards 6 are made of an elastomeric material.

The elastomeric material of the arcs 6 is, for example, polysiloxane, also called silicone. An already crosslinked silicone material is a solid material which has a defined shape and may be easily handled, in particular may be cut and/or machined to tight dimensional tolerances, whereas a non-crosslinked silicone material is generally in the form of a dough, which has no definite shape.

The fuse 2 also comprises shims 58, which are connected to the fuse blades 4 or to the arc guards 6 so as to be immobilized with respect to the fuse blades 4, in particular during the assembly or handling of the fuse 2. Thus, during the assembly of the fuse 2, the forces due to handling are distributed among all the fuse blades 4, which reduces the risk of damaging the fuse blades 4.

The shims 58 also make it possible to immobilize the fuse blades 4 relative to the frame 48 when it is present and/or relative to the body 20 when the fuse 2 is fully assembled. Optionally, when the frame 48 is present, some of the shims 58 cooperate with the notches 54, or else with other shapes or machining, not shown, which are formed in the frame 48, so as to limit the movements of the fuse blades. 4 relative to the frame 48. More generally, the frame 48 limits the movements of the fuse blade 4 by means of the spacers 52 and/or the shims 58. Thus, during assembly of the fuse 2, the fuse blades 4 are protected by the frame 48. The assembly operation may be carried out more quickly, with a reduced probability of faults, which is economically advantageous.

In the example of FIG. 2, the shims 58 each have the shape of a parallelepiped. Advantageously, the shims 58 are made of a material identical to the material of the arc guards 6, for example of an elastomeric material already crosslinked such as silicone. In FIG. 2, the shims 58 and the arc guards 6 are shown schematically. In particular, the proportions between the dimensions of the arc guards 6 and of the shims 58 are not limiting.

In the example illustrated, the reduced sections 46A of the fuse blade 4 are aligned on the transverse plane P4, and the arc guards 6 are disposed on either side of the transverse plane P4. Some of the shims 58, located in the vicinity of the reduced section 46A, are interposed between two arc guards 6 located on the same side of the transverse plane P4 and belonging respectively to two neighboring fuse blade 4.

Advantageously, the shims 58 are fixed to the fuse blades 4 or to the arc guards 6 by gluing, i.e. in a manner analogous to the way described later in the present description, in which the arc guards 6 are attached to the fuse blades 4.

As a variant, when an arc guard 6 is in contact with a shim 58, this shim 58 is integral with this arc guard 6. Such an arc guard 6 contributes, on the one hand, to the extinction of the arc and, on the other hand, to maintain the fuse blades 4.

When the fuse 2 is fully assembled, the shims 58 are slightly compressed in the direction of the axis A4. In particular, the arc guards 6 are slightly compressed in the direction of the axis A4 by means of the shims 58.

When the frame 48 is present, some of the shims 58 cooperate with the frame 48 so that the arc guards 6 are compressed in the direction of the axis A4.

We now describe a sub-assembly comprising a fuse blade 4 with a reduced section 46A and two pairs 60 of arc guards 6 located in the vicinity of this reduced section 46A, in particular with the aid of FIG. 3.

Each arc guard 6 here has an elongated parallelepipedal shape and is disposed along its length parallel to the reduced section 46A, the length of each arc guard 6 here being equal to the width of the fuse blade 4. In a variant not shown, each arc guard 6 has a length greater than the width of the fuse blade 4. Each arc guard 6 has a front face 62, which is oriented towards the reduced section 46A in the vicinity of which this arc guard 6 is located, and a rear face 64, opposite the front face 62, in other words facing away from the reduced section 46A. A length L6 is defined as being a length separating the front face 62 from the rear face 64.

Each arc guard 6 has an internal face 66 which is oriented towards a main face of the fuse blade 4, and an external face 68 which is oriented opposite the internal face 66. A thickness L7 of a arc guard 6 is defined as being a distance separating the internal face 66 from the external face 68.

Two border lines 70 of the reduced section 46A are defined as being two lines parallel to the transverse plane P4, located on either side of the plane P4 and containing the reduced section 46A, the two border lines 70 each being at a tangent to at least one hole 44 of the reduced section 46A. Each border line 70 is therefore located between the reduced section 46A and the front face 62 of the neighboring arc guards 6. In the example illustrated in FIG. 3, the holes 44 of the reduced section 46A are all aligned and have the same diameter, thus the border lines 70 are at a tangent to all the holes 44 of the reduced section 46A.

For each arc guard 6, a distance L8 is defined between this arc guard 6 and the reduced section 46A situated opposite as being a distance, measured parallel to the axis A2, between the front face 62 of this arc guard 6 and the closest to the border lines 70 of the reduced section 46A opposite.

For each arc guard 6, a layer of adhesive 72 is interposed between the internal face 66 and the face of the fuse blade 4 situated opposite, so as to fix this arc guard 6 on the fuse blade 4. In other words, each arc guard 6 is glued to the fuse blade 4. To ensure that each arc guard 6 is properly secured to the fuse blade 4, each internal face 66 is preferably flat.

When the two arc guards 6 of the same pair 60 are fixed on the fuse blade 4, the internal faces 66 of the arc guards 6 of the same pair 60 are superimposed on one another.

Each adhesive layer 72 is preferably a thin layer, i.e. having a thickness between 10 μm and 0.5 mm, preferably less than 0.1 mm. Each adhesive layer 72 is preferably uniform, i.e. the adhesive layer 72 has a constant thickness over the entire internal face 66.

According to examples, the adhesive layer 72 is applied directly to the fuse blade 4, the arc guard 6 then being positioned on the fuse blade 4 and then set to rest while being held motionless to allow the adhesive time to harden.

Preferably, the internal face 66 of an arc guard 6 is pre-glued, i.e. the adhesive layer 72 is applied directly to the internal face 66 of an arc guard 6. The pre-glued arc guard 6 is then positioned on the fuse blade 4 and then set to rest while being kept immobile, for example by means of a device such as a holding clamp, to give the adhesive time to harden. The holding clamp is not shown. Depending on the composition of the adhesive layer 72, the attachment of the arc guard 6 to the surface of the fuse blade 4 may be instantaneous. By "instantaneous" is meant that the hardening of the adhesive layer 72 takes only a few seconds, for example less than 10 seconds, which is very short compared to the crosslinking time of an uncrosslinked silicone material.

The adhesive layer 72 is applied for example by spraying. As a variant, the adhesive layer 72 may be a so-called "double-sided" adhesive, i.e. the adhesive layer comprising a substrate such as a sheet, made of paper or of insulating polymer, having both sides coated with a respective adhesive film. The use of double-sided adhesive allows easy assembly of the fuse 2.

During use, a fuse 2 heats up because of the electric current flowing through it, and this fuse 2 may have a temperature greater than 100° C., for example between 150° C. and 200° C., and this for several months or even several years. The adhesive used to fix the arc guards 6 to the fuse blades 4 is selected to withstand these operating conditions. On the other hand, when the fuse 2 blows and an electric arc appears, the adhesive may be exposed to an electric arc. The adhesive is selected so as not to cause an exothermic reaction when subjected to an electric arc.

By way of nonlimiting examples, the adhesive is an inorganic adhesive, such as a silicone adhesive, or else an organic adhesive, such as a cyanoacrylate adhesive, an epoxy adhesive, or even a vinyl or acrylic, or aliphatic, or polyurethane, or neoprene adhesive, etc. Depending on the type of adhesive used, surface activation may be necessary, for example on the internal face 66 of the arc guards 6.

The principle of operation of a fuse blade 4 comprising arc guards 6 disposed in the vicinity of the reduced section 46A is now described schematically. When this fuse blade 4, connected to a circuit, is traversed by too much electric current, the reduced section 46A melts and an electric arc appears at the reduced section 46A. As long as this arc exists, an electric current continues to flow through the fuse blade 4, the material of the fuse blade 4 continues to melt, and the arc continues to propagate away from the reduced section 46A. As the arc length increases, the arc voltage increases. Finally, when the arc voltage reaches a value greater than an electric voltage of the circuit, the arc is extinguished, and no more electric current circulates through the fuse blades 4. The time between the instant of appearance of the electric arc and the instant of extinction of the arc defines a fuse 2 cut-off time.

In the context of the present invention, the two arc guards 6 of a pair 60 create between them a confinement zone, which channels the ionic products generated by the arc as the arc progresses. The progression of the electric arc is thus channeled in a preferential direction, which is here parallel to the axis A2 while moving away from the reduced section 46A. The progression of the arc thus channeled is faster than in the absence of an arc guard 6, as is the case in the prior art. As the arc grows faster, the arc voltage also increases faster, and the arc extinction instant is reached faster. Thanks to the arc guards 6, the cut-off time of the fuse blades 4 is shorter. In other words, the cutting of a fuse 2 comprising arc guards 6 on either side of the reduced sections 46A has a faster cut-off time.

As long as the arc has not reached the arc guards 6, the speed of progression of the arc is not appreciably influenced by the arc guards 6, i.e. the speed of progression of the arc is similar to what happens in the absence of an arc guard. If the arc guards 6 are too far from the reduced section 46A, the effect of the arc guards 6 is unnecessarily delayed.

Conversely, if the arc guards 6 are too close to the reduced section 46A, when the arc appears, the heat released by the latter is too great and risks breaking down the material of the arc guards 6, for example by carbonization. Likewise, in normal operation, the reduced section 46A heats up more than the other parts of the fuse blades 4. If the arc guards 6 are too close to the reduced section 46A, the arc guards 6 may age more quickly, in particular harden, which is not desirable, for reasons explained later in the present description. Thus, the distance L8 between the arc guards 6 and the border line 70 of the reduced section is between 1 mm and 15 mm, preferably between 3 mm and 10 mm, more preferably between 4 mm and 8 mm. A distance L8 equal to 6 mm gives good results.

In order for the confining effect of the arc guards 6 to be significant and to prevent the arc from being able to bypass the arc guard 6, the arc guard 6 must in particular have a sufficient thickness L7. Thus each arc guard 6 has a thickness L7 greater than 0.2 mm, preferably greater than 0.5 mm, more preferably greater than 1 mm. A thickness L7 equal to 2 mm gives good results. The thickness L7 is not limited, except for example for practical reasons of space, in particular during the assembly of the fuse 2. Thus the thickness L7 is less than 20 mm, preferably less than 10 mm, more preferably less than 5 mm.

For the confining effect of the arc guards 6 to be significant, it is also necessary that the electric arc may be channeled over a sufficient length, so that the arc voltage reaches the voltage of the circuit before the arc emerges on the side of the rear face 64 of the arc guards 6. If the length L6 of the arc guards 6 is too short, the electric arc will emerge from the side of the rear face 64 of the arc guards 6, and then continue to progress at a speed similar to what happens in the absence of an arc guard. Thus each arc guard 6 has a length L6 greater than 5 mm, preferably greater than 7 mm. The length L6 is not limited, except for example for practical reasons of space. Thus the length L6 is less than 30 mm, preferably less than 25 mm, more preferably less than 20 mm.

The hardness of the elastic material of the arc guards 6 has a not insignificant influence on the reduction of the cut-off time of the fuses 2. The elastic material of the arc guards 6 has a hardness evaluated on a scale called Shore-A, which ranges from 0 for a very soft material to 100 for a very hard material. The confining effect of a material that is too soft, having a Shore-A hardness of less than 20, is insufficient. A hardness greater than 40 is preferred.

Conversely, an arc guard 6 made of too hard a material does not offer good performance either. The material of the arc guards 6 is thus chosen with a Shore-A hardness of less than 90. On the other hand, under the operating conditions of a fuse 2, the arcs 6 are subjected to temperatures which may exceed 100° C. or 150° C., and elastomers tend to harden with age. The material of the arc guards 6 is thus chosen so that its Shore-A hardness remains less than 90 even after aging. Thus the Shore-A hardness of the new material of the arc guards 6 is preferably chosen to be less than 70.

Thus the arc guards 6 are made of a material having a hardness, measured on a Shore-A scale, between 20 and 90, preferably between 40 and 70.

Surprisingly, the state of mechanical compression of the arc guards 6 has a positive influence on the reduction of the cut-off time of the fuses 2. Advantageously, when the fuse 2 is assembled, the arc guards 6 are slightly compressed in one direction, parallel to the axis A4, i.e. a direction orthogonal to the main faces of the fuse blades 4 at the place where these arc guards 6 are located. When the fuse 2 is assembled, each arc guard 6 is compressed and has a thickness L7 less than 99% of the thickness L7 of this same arc guard 6 when this arc guard 6 is not subjected to any external stress, preferably less than 98%, more preferably less than 95%.

The compression of the arc guards 6 of the same pair is effected by means of specific devices, such as compression clamps, and/or by means of the frame 48 when it is present, for example via shims 58.

Compression clamps are not shown. When holding clamps are used during assembly to immobilize the arc guards 6 and give the adhesive time to harden, these holding clamps also advantageously serve as compression clamps and are left in place on the arc guards 6 once the adhesive layer 72 has hardened.

Figure 4:
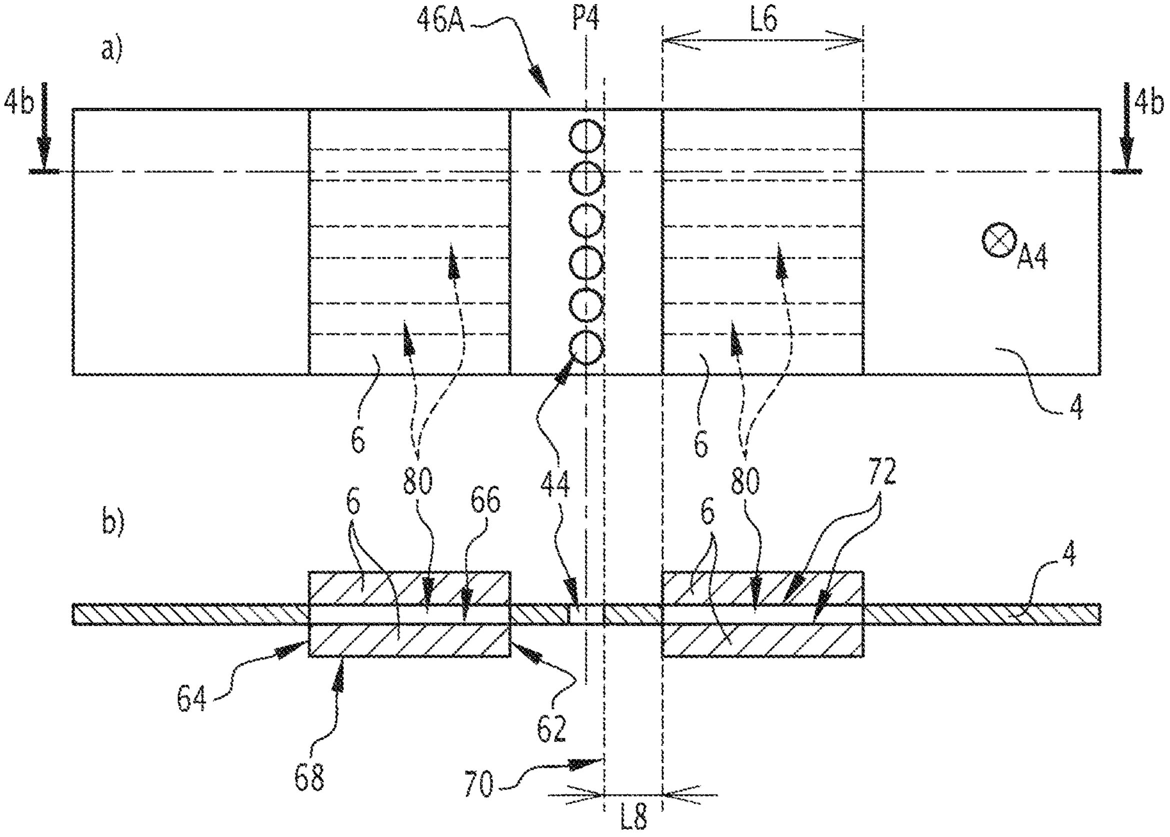
FIG. 4 shows schematically, on inserts a) and b), two views of the same fuse blade and of arcs in accordance with another embodiment of the invention.
Figure 5:
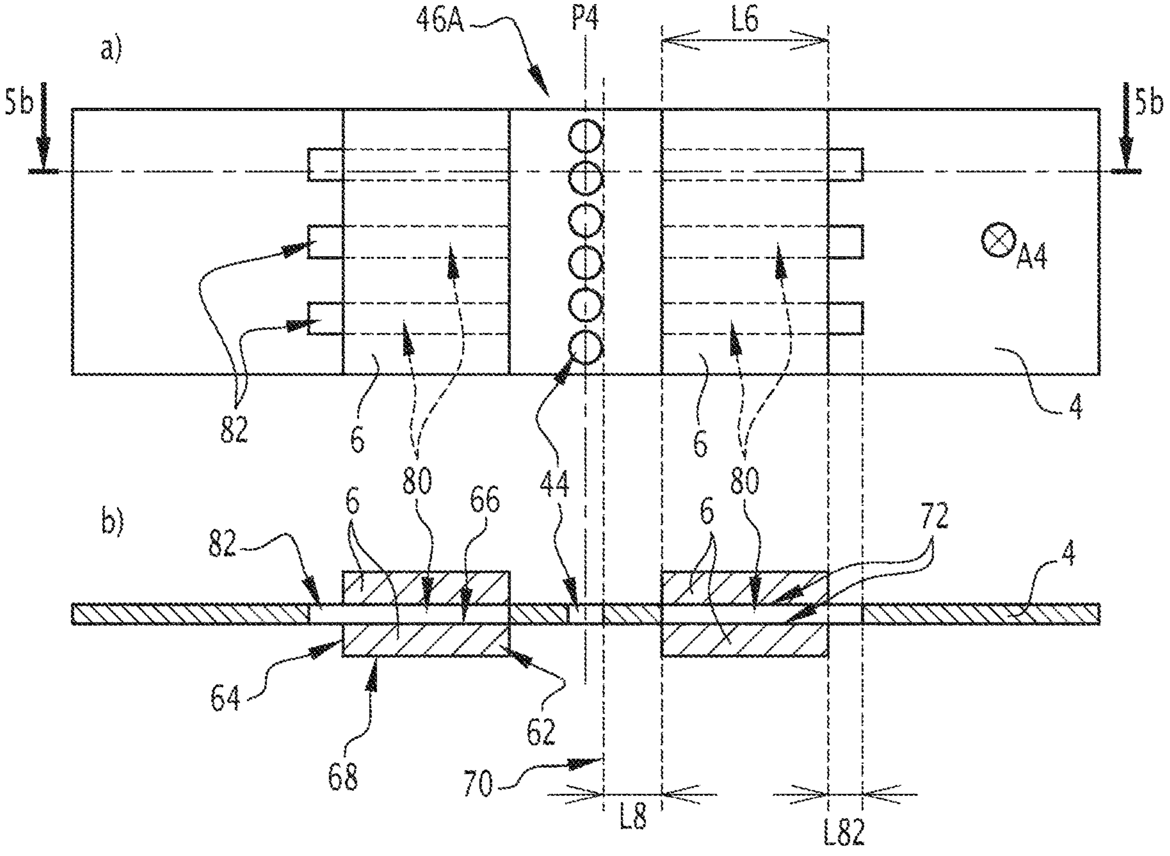
FIG. 5 is a figure similar to FIG. 4, showing the same fuse blade and arcs in accordance with another embodiment of the invention.
Figure 6:
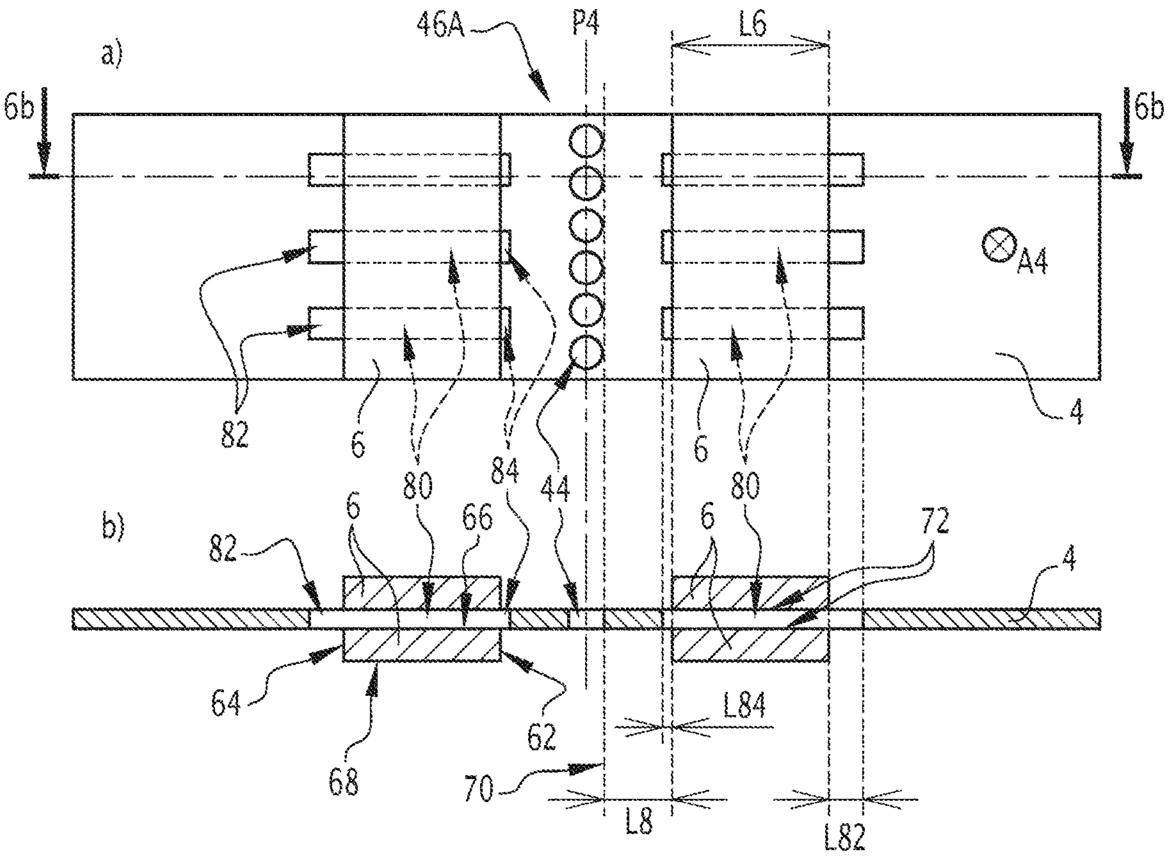
FIG. 6 is a figure similar to FIG. 4, showing the same fuse blade and arcs in accordance with another embodiment of the invention.
Figure 9:
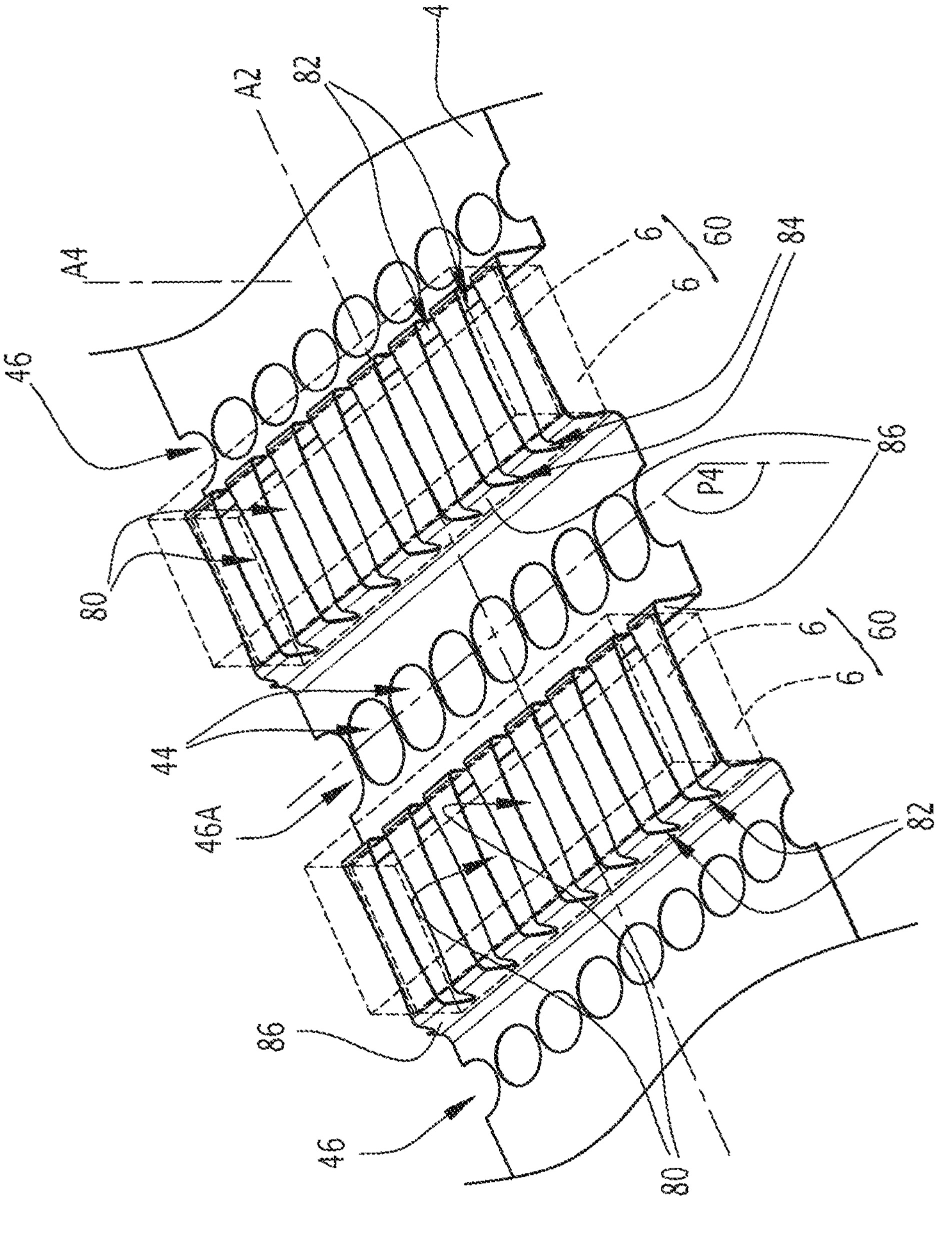
FIG. 9 is a figure similar to FIG. 3, showing a fuse blade and arcs in accordance with another embodiment of the invention.
Figure 10:
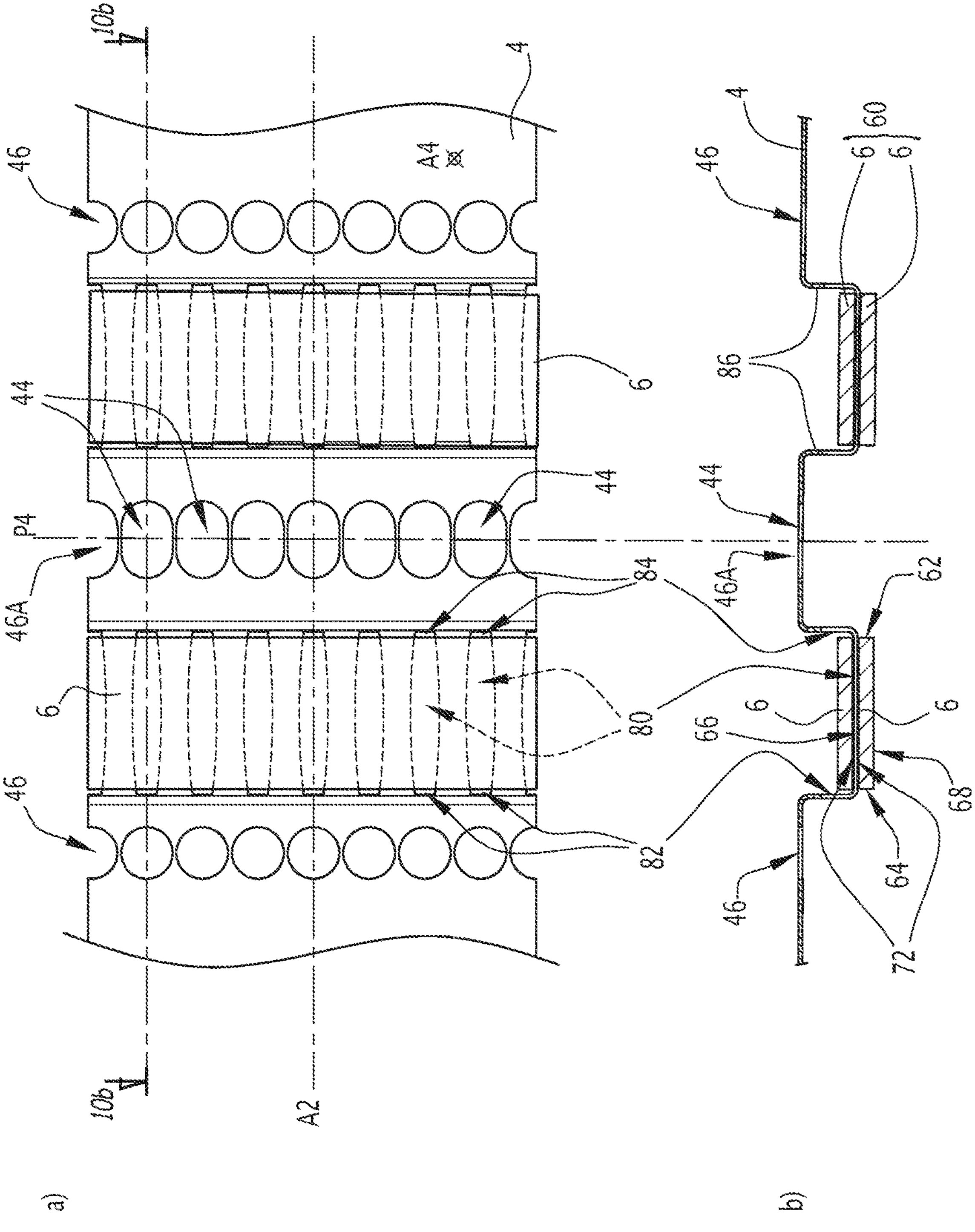
FIG. 10 represents schematically, on inserts a) and b), two views of the same fuse blade and of the arcs of FIG. 9.

A fuse blade 4 and arc guards 6 in accordance with second, third and fourth embodiments of the invention are shown in FIGS. 4, 5 and 6 respectively, while a fuse blade 4 and arc guards 6 according to a fifth embodiment of the invention are shown in FIGS. 9 and 10. Elements similar to those of the first embodiment bear the same references and operate in the same way. In what follows, the differences between each embodiment and the previous one(s) are mainly described.

One of the main differences of the second embodiment, shown in FIG. 4, with the first embodiment is that at least one perforation 80 is made in the fuse blade 4 on each side of the reduced section 46A, in other words on either side of the transverse plane P4. In the first embodiment, the perforations 80 are covered by the arc guards 6, i.e. as long as the fuse 2 has not melted, the perforations 80 are completely sealed in the direction of axis A4 by the internal faces 66 of the arc guards 6. The same fuse blade 4 is shown on the inserts a) and b) of FIG. 4, the insert b) representing a section of the fuse blade 4 of the 'insert a) along a section plane 4*b* on the insert a).

Figure 7:
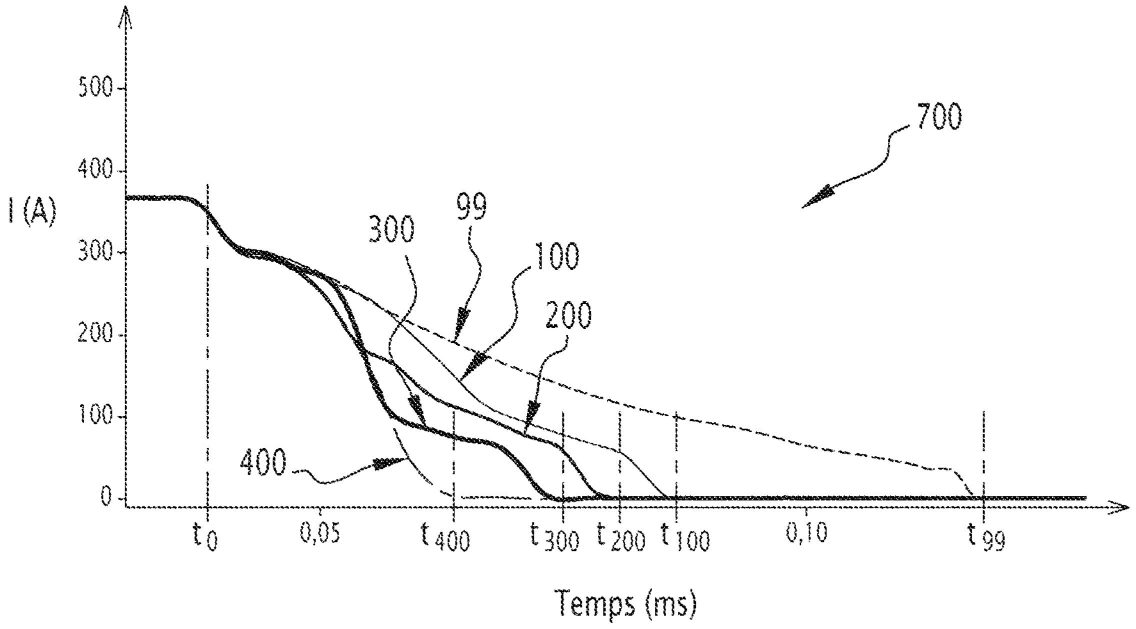
FIG. 7 is a graph illustrating the evolution of an electric current passing through fuse blade in accordance with the state of the art or with embodiments of the invention.

The perforations 80 reduce the amount of material to be melted during the progression of the electric arc, once the arc reaches the front face 62 of the arc guards 6. The progression of the arc is thus faster than in the first embodiment of the invention, as illustrated in FIG. 7. The perforations 80 are not obstructed, in the direction parallel to the axis A2 of the fuse 2, by the layers of adhesive 72 or by the arc guards 6, so as not to hinder the progression of the electric arc.

Advantageously, the perforations 80 each have an elongated shape and are disposed in their length parallel to the axis A2 of the fuse 2, in other words parallel to the longitudinal direction of the fuse blade 4. Schematically, the perforations 80 of elongated shape provide channels, parallel to the longitudinal axis A2, which promote the progression of the electric arc. In the second embodiment of the invention, each perforation 80 has a length, measured parallel to the longitudinal axis A2 of the fuse 2, substantially equal to the length L6 of the arc guards 6 which close this perforation 80.

The perforations 80 made on one side of the transverse plane P4 are preferably symmetrical to the perforations 80 made on the other side of the transverse plane P4. The perforations 80 located on the same side of the transverse plane P4 form a group of perforations 80. In the first embodiment, the perforations 80 of the same group are thus entirely closed off by the internal faces 66 of the two arc guards 6 of the same pair 60.

In the example illustrated, each group of perforations 80 comprises three perforations 80, this number not being limiting. As a variant, each group of perforations 80 comprises a single perforation 80, or two, or even four or more.

The perforations 80 of the same group are preferably disposed in rows, i.e. aligned with respect to each other in a direction transverse to the fuse blade 4, in other words in a direction orthogonal to the axis A2.

In the example illustrated in the insert a) of FIG. 4, the perforations 80 have a rectangular section. In nonlimiting variants, the perforations 80 have the shape of an oval or else an ellipse or else the shape of a diamond or more generally an oblong shape. The shape of the perforations 80 depends in particular on the method of manufacturing the perforations 80, the perforations 80 being, without limitation, produced by stamping, by laser cutting or even by electro-erosion. The perforations 80 of the same group preferably each have the same shape.

For each group of perforations 80, the more the perforations 80 are numerous and have a significant width, the width being measured parallel to the transverse direction of the fuse blades 4, and the more the electrical resistance, measured parallel to the axis A2 of the fuse 2, the passage of this group of perforations 80 increases. However, unlike the reduced sections 46 or 46A, the purpose of the perforations 80 is not to promote, in the event of an overcurrent, the start of the electric arc in the event of an overcurrent, but to provide passages favoring the progression of the arc once the arc reaches the arc guards 6.

For each fuse blade 4, the surface section of a group of perforations 80, measured along the longitudinal axis of this fuse blade 4, is five times greater, preferably ten times greater, than the smallest surface section among the reduced surface sections 46 or 46A provided on this fuse blade 4.

The perforations 80 of the same group are preferably regularly spaced apart in the transverse direction of the fuse blade 4, to avoid locally weakening the material of the fuse blade 4 or to avoid creating a hot spot when the current flows in the fuse blade 4.

One of the main differences of the third embodiment, shown in FIG. 5, with the second embodiment is that the perforations 80 protrude from the arc guards 6 on the side opposite the reduced section 46A. The same fuse blade 4 is shown on the inserts a) and b), the insert b) representing a section of the fuse blade 4 of the insert a) along a sectional plane 5*b* on the insert a).

Each perforation 80 extends parallel to the longitudinal axis A2 of the fuse 2, beyond the rear face 64 of the neighboring arc guards 6. Each perforation 80 thus comprises a rear portion, located on the side opposite to the reduced section 46A, which protrudes from the rear face 64 and forms a rear vent 82, through which the perforation 80 opens.

When an arc progresses between the arc guards 6 of the same pair 60, the rear vents 82 make it possible to evacuate more rapidly the products generated by the arc, in particular the molten metal or other ionized products. The rapid elimination of these products destabilizes the arc, which leads to a reduction in the time required to reach the total interruption of the current.

For each perforation 80, a length L82 is defined as being a length, measured parallel to the longitudinal axis A2 of the fuse 2, between one end of this perforation 80 furthest from the reduced section 46A and rear face 64 of the neighboring arc guard 6. The length L82 thus represents a length of a rear vent 82. The length L82 is between 0.1 mm and 10 mm, preferably between 0.5 and 8 mm, more preferably between 1 mm and 5 mm.

Thus in the third embodiment, the perforations 80 of the same group are partly closed off by the internal faces 66 of the two arc guards 6 of the same pair 60.

One of the main differences of the fourth embodiment, shown in FIG. 6, with the third embodiment is that perforations 80 protrude from the arc guards 6 on the side facing the reduced section 46A. The same fuse blade 4 is shown on the inserts a) and b) of FIG. 6, the insert b) showing a section of the fuse blade 4 of the insert a) along a cutting plane 6*b* on the insert a).

Each perforation 80 extends parallel to the longitudinal axis A2 of the fuse 2, beyond the front face 62 of the arc guards 6. Each perforation 80 thus comprises a front portion, located on the side of the reduced section 46A, which protrudes from the front face 62 and forms a front vent 84, through which the perforation 80 opens. Thus in the fourth embodiment, the perforations 80 of the same row are partly closed by the internal faces 66 of the two arc guards 6 of the same pair 60.

When an arc progresses towards the arc guards 6 of the same pair 60, the front vents 84 allow part of the molten metal or other ionized products generated by the arc to be evacuated in the vicinity of the reduced section 46A, the cavity V20 being filled with sand. These ionized products thus no longer promote the maintenance of the arc.

For each perforation 80, a length L84 is defined as being a length, measured parallel to the longitudinal axis A2 of the fuse 2, between one end of this perforation 80 closest to the reduced section 46A and front face 62 of the neighboring arc guard 6. The length L84 thus represents a length of one of the front vents 84. The length L84 is between 0.1 mm and 5 mm, preferably between 1 and 3 mm.

FIG. 7 represents a graph 700, illustrating the evolution of an electric current passing through a fuse blade 4 comprising a reduced section 46A for different fuse blades 4 having different characteristics. The performance of a fuse 2 is evaluated in particular by a cut-off time, which is a time necessary for the electric current to be canceled once the melting of the reduced section 46A begins.

Curve 99 illustrates the evolution of the current in the case where the fuse blade 4 does not comprise an arc guard in the vicinity of the reduced section 46A. An electric arc appears at an instant $t_0$. The current is zero at an instant $t_{99}$. The breaking time is equal to $t_{99}-t_0$.

Curve 100 illustrates the evolution of the current in a case where the fuse blade 4 comprises arc guards 6 in accordance with the first embodiment of the invention described above, i.e. two pairs 60 of arc guards 6 are disposed on either side of the reduced section 46A. The current is zero at a time $t_{100}$. The cut-off time of a fuse blade 4 comprising arc guard 6, equal to $t_{100}-t_0$, is approximately 40% less than the cut-off time of a fuse blade 4 without an arc guard.

The curve 200 illustrates the evolution of the current in a case where the fuse blade 4 comprises arc guards 6 in accordance with the second embodiment of the invention described above, i.e. the perforations 80 are made in the fuse blade 4 between the arc guards 6 of the same pair 60. The current is zero at an instant $t_{200}$. The cut-off time of a fuse blade 4 comprising arc guards 6 with perforations, equal to $t_{200}-t_0$, is approximately 45% less than the breaking time of a fuse blade 4 without an arc guard.

The curve 300 illustrates the evolution of the current in a case where the fuse blade 4 comprises arc guards 6 in accordance with the third embodiment of the invention described above, i.e. the perforations 80 protrude from the arc guards 6 on the side opposite to the reduced section 46A. The current is zero at an instant $t_{300}$. The cut-off time of a fuse blade 4 comprising arc guards 6 with perforations and rear vents 82, equal to $t_{300}-t_0$, is approximately 50% less than the cut-off time of a fuse blade 4 without an arc guard.

The curve 400 illustrates the evolution of the current in a case where the fuse blade 4 comprises arc guards 6 in accordance with the fourth embodiment of the invention described above, i.e. the perforations 80 protrude from the arc guards 6 both on the side of the reduced section 46A and on the side opposite the reduced section 46A. The current is zero at an instant $t_{400}$. The cut-off time of a fuse blade 4 comprising arc guards 6 with perforations 80 and front 84 and rear 82 vents, equal to $t_{400}-t_0$, is approximately 60% less than the cut-off time of a fuse blade 4 without an arc guard.

FIG. 7 presents an aspect of the improvement in performance, measured by the reduction in the cut-off time, of the fuses 2 in accordance with the invention, compared with the fuses according to the prior art. The fuses 2 in accordance with the second and third and fourth embodiments of the invention, in which the perforations 80 located on the same side of the reduced section 46A are at least partly blocked by the arc guards 6 of the same pair 60, make it possible to further improve the performance of the fuse 2 compared to the first embodiment of the invention. In the example illustrated, the perforations 80 are made on each side of the reduced section 46A. In a variant not shown, one or more perforations 80 are made on one side of the reduced section 46A, in the vicinity of this reduced section 46A, at least one perforation 80 also contributing to the extinction of the electric arc.

In the example illustrated, the arc guards 6 are disposed only on either side of the reduced section 46A located in the middle of a fuse blade 4 in order to explain the invention. Of course, when the fuse blade 4 comprises reduced sections 46 other than the reduced section 46A, other arc guards, of the type of arc guards 6, may if necessary be placed in the vicinity of these reduced sections 46.

According to a variant not shown, the two pairs 60 of arc guards 6 are separated from one another by two, or even more, reduced sections of the type of reduced sections 46 and/or 46A. As described above, the perforations 80 and the arc guards 6 have shapes with precise dimensions, these dimensions being able to change in particular according to the dimensioning and the rating of the fuse 2, the size of the holes 44 of the reduced section 46A.

In the example illustrated, the pair 60 of arc guards 6 is assembled on a flat portion of the fuse blade 4. In a variant not shown, when the fuse blade 4 has folds, like the transverse folds 42, the folds form folds with various profiles, such as a flat, a slot, etc. The arc guards 6 may take place directly in a fold, for example a fold or a slot, which makes it possible to shorten the net length of the fuse blades 4.

Figure 8:
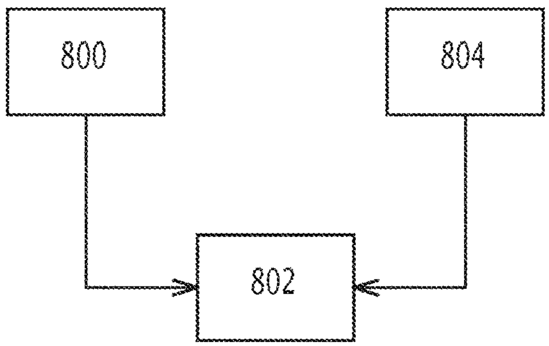
FIG. 8 is a diagram showing steps of a method of manufacturing a fuse blade and arc arresters according to embodiments of the invention.

The method of manufacturing the fuse 2, described in particular with the aid of FIG. 8, thus comprises a step 800 consisting in manufacturing two arc guards 6 of a first pair 60, the arc guards 6 being made of a preformed elastic material, in particular of crosslinked elastomer, and each having a planar internal face 66. In a nonlimiting manner, the arc guards 6 are for example manufactured by molding, the internal face 66 being optionally rectified by machining. According to another example, one manufactures, for example by calendering, a calibrated strip of elastic material having a width equal to the width of the fuse blades 4 on which the arc guards 6 are intended to be glued, the strip having an equal thickness to the thickness L7 of the arc guards 6. The arc guards 6 are then cut from this calibrated strip. One or more of the faces of the arc guards 6 may be machined to correct their geometry, in particular the internal face 66, which is preferably flat to promote the adhesion of the adhesive layer 72, and the front face 62, oriented towards the reduced section 46A.

Then, the method comprises a step 802 consisting in gluing each arc guard 6 of the same pair 60 on a respective main face of the fuse blade 4 in the vicinity of the reduced section 46A, by interposing a layer of adhesive 72 between the internal face 66 of each arc guard 6 and a respective main face of the fuse blade 4. The arc guards 6 are located on the same side of the transverse plane P4, the front faces 62 of the arc guards 6 being oriented towards the reduced section 46A, so that the distance L8 between the front face 62 of each arc guard 6 and the closest border line 70 is between 1 mm and 15 mm.

When perforations 80 are made in the fuse blades 4, the manufacturing method comprises a step 804, prior to the gluing step 802, consisting in providing in the fuse blade 4 at least one perforation 80 in the vicinity of the reduced section 46A. During the bonding step 804, the arc guards 6 are placed on the fuse blade 4 so that the perforations 80 are essentially closed by the arc guards 6. When the perforations 80 have a length greater than the length L6 of the arc guards 6, the front vents 84 and/or rear 82 vents are provided.

The fifth embodiment of the fuse blade 4 and of the arc guards 6, shown in FIGS. 9 and 10, resembles the fourth embodiment in that the perforations 80, formed in the vicinity of the reduced section 46A, protrude from the front 62 and rear 64 faces of the arc guards 6, to respectively form front 84 and rear 82 vents. Each of the perforations 80 is at least partially closed off by the internal faces 66 of the two arc guards 6 of the same pair 60, each perforation 80 leaving a cavity between the two arc guards 6 of the same pair 60. As in the other embodiments, the arc guards 6 of the fourth embodiment are made of an elastic material, here in silicone, are associated by pair 60 and are fixed on the fuse blade 4 by means of a layer of adhesive 72, which is interposed between the fuse blade 4 and an internal face 66 of each arc guard 6 of the corresponding pair 60.

Among the main differences of the fuse blade 4 and the arc guards 6 of the fifth embodiment compared to the previous embodiments, the perforations 80 are in the shape of an elongated ellipse, which extend in their length parallel to the longitudinal axis A2 of the fuse 2. On the other hand, the fuse blade 4 here has folds 86 at the front 62 and rear 64 faces of the arc guards 6, In the example illustrated, the folds 86 are located in a plane parallel to the transverse plane P4. The front 84 and rear 82 vents extend over these folds 86. Thus the front vents 84 are oriented towards the reduced section 46A. In the example illustrated, the rear vents 82 of each pair 60 of arc guards 6 are oriented towards a respective reduced section 46. According to the naming conventions used in the present description, the rear vents 82, with respect to the reduced section 46A, are therefore front vents with respect to one of the reduced sections 46.

Such a structure of fuse blade 4, comprising folds 86, allows a more compact structure compared to a fuse blade 4 without folds.

In all of the illustrated embodiments, the arc guards 6 are made of a preformed elastic material, in particular of an elastomeric material such as silicone. Optionally, the arc guards 6 may comprise mineral and/or organic particles, which are added to the elastic material in the form of powder and/or fibers. These particles serve to adjust the properties of the material of the arc guards 6, for example serve to adjust the Shore hardness of the material, and/or serve as mechanical reinforcement. The material of the arcs 6 is then a reinforced material, also called a composite material, comprising a matrix made of an elastic material, in particular made of an elastomeric material such as silicone. As opposed to a reinforced material, a material without added particles is said to be "raw material".

According to a variant not shown, the arc guards are made of a foamed elastic material, i.e. a material containing gas bubbles and having an average porosity greater than 50%, preferably greater than 60%, more preferably more than 70%. The average porosity of a part is defined as the fraction of the volume of gas bubbles contained in that part over the total volume of that part.

According to another variant not shown, the arc guards 6 consist of several layers of materials stacked one on top of the other. At least one of the layers is made of an elastic material as described above, in particular of an elastomeric material such as silicone. According to examples, these layers have distinct characteristics, in particular distinct hardness characteristics, and these layers of materials are advantageously assembled to each other by gluing.

Many other embodiments are possible.

In particular, the characteristics of the fuse blade 4 and of the arc guards 6 according to the invention, and in particular the structural characteristics of the arc guards and their manufacturing method may be implemented independently of the body 20 comprising a frame 48 described above, above and could be implemented in a conventional fuse body. In particular, the perforations 80 may be used independently of the frame 48.

Any characteristic described for an embodiment or a variant in the above may be implemented for the other embodiments and variants described above, as far as technically feasible.

The invention claimed is:

1. A fuse, comprising:

at least one fuse blade, formed in a sheet having two opposite main faces extending along a longitudinal axis of the fuse blade, each fuse blade comprising a portion in which is formed a reduced section defining a transverse plane to the fuse blade; and two connection terminals, each terminal being connected to each fuse blade, arc guards, made of a preformed elastic material, which are associated in pairs, the arc guards of the same pair being each located opposite one another on one main respective side of the same fuse blade, wherein:

for at least a first pair of arc guards, an adhesive layer is interposed between the fuse blade and an internal face of each arc guard of this pair, the internal face being oriented towards one of the main faces of the fuse blade, so as to fix each arc guard on the fuse blade, and the adhesive layer is made of a material that is of a different grade or of a different type from the elastic material of the arc guards.

2. The fuse according to claim 1, wherein the fuse comprises, in addition to the first pair of arc guards, a second pair of arc guards, the first and second pairs of arc guards being separated from each other by at least one reduced section.

3. The fuse according to claim 1, in which each arc guard comprises a front face, oriented towards a reduced section, and a rear face opposite to the front face, and in which the front and rear faces of each arc guard are separated by a length of between 5 mm and 30 mm.

4. The fuse according to claim 3, wherein a distance between the front face and a border line of the reduced section located opposite, is between 0.5 mm and 20 mm.

5. The fuse according to claim 4, wherein the distance between the front face and the border line of the reduced section located opposite, is between 1 mm and 15 mm.

6. The fuse according to claim 4, wherein the distance between the front face and the border line of the reduced section located opposite, is between 2 mm and 12 mm.

7. The fuse according to claim 1, wherein each arc guard comprises an external face, opposite the internal face, and each arc guard has a thickness, defined as being a distance separating the internal face from the external face, between 0.2 mm and 20 mm.

8. The fuse according to claim 1, wherein the arc guards are made of an elastomeric material, which has a hardness, measured on a Shore-A scale, of between 20 and 90.

9. The fuse according to claim 8, wherein the arc guards are made of an elastomeric material, which has a hardness, measured on a Shore-A scale, of between 40 and 70.

10. The fuse according to claim 1, wherein the arc guards are made of silicone.

11. The fuse according to claim 1, wherein at least one perforation is formed in the fuse blade on one side of the reduced section, each of said perforations being at least partially closed by the internal faces of the two arc guards of the same pair.

12. The fuse according to claim 11, wherein the perforations extend parallel to the longitudinal direction of the fuse blade beyond the rear face of the arc guards, so as to form rear vents.

13. The fuse according to claim 12, wherein the rear vents have a length between 0.1 mm and 10 mm.

14. The fuse according to claim 13, wherein the rear vents have a length between 0.5 and 8 mm.

15. The fuse according to claim 14, wherein the rear vents have a length between 1 mm and 5 mm.

16. The fuse according to claim 11, wherein the perforations extend parallel to the longitudinal direction of the fuse blade beyond the front face of the arc guards so as to form front vents, and in which the front vents have a length of between 0.1 mm and 5 mm.

17. The fuse according to claim 16, wherein the front vents have a length of between 1 and 3 mm.

18. The fuse according to claim 1, wherein the fuse comprises a frame which is received in a cavity of a body of the fuse and which limits the movements of the fuse blades relative to the body by means of spacers and/or shims, the frame being made of an insulating material.

19. The fuse according to claim 1, in which when the fuse is assembled, the arc guards are compressed in a direction orthogonal to the main faces of the fuse blade, each arc guard having a thickness less than 99% of the thickness of this same arc guard when this arc guard is not subjected to any external stress.

20. A method of manufacturing the fuse according to claim 1, the fuse comprising at least one fuse blade with a reduced section defining a transverse plane to the fuse blade; wherein the method comprises the steps of:

manufacturing two hardened arc guards of a first pair, the arc guards being made of an elastic crosslinked material and having a flat internal face, after the arc guards are hardened, gluing each arc guard of the first pair on a respective main face of the fuse blade in the vicinity of the reduced section, by interposing a layer of adhesive between the internal face of each arc guard and a respective main face of the fuse blade, such that a distance between a front face of each arc guard and a border line of the reduced section opposite is between 1 mm and 15 mm.

21. The method of manufacturing according to claim 20, wherein the method comprises a step, prior to the gluing step, consisting in providing in the fuse blade at least one perforation of each side of the transverse plane, and in which, during the gluing step, the arc guards of the first pair are glued to the fuse blade so that each perforation is at least partially blocked by the arc guards.

22. The fuse according to claim 19, wherein when the fuse is assembled, the thickness of each arc guard is less than 98% of the thickness of this same arc guard when this arc guard is not subjected to any external stress.

23. The fuse according to claim 22, wherein when the fuse is assembled, the thickness of each arc guard is less than 95% of the thickness of this same arc guard when this arc guard is not subjected to any external stress.

* * * * *